(12) United States Patent
Medasani et al.

(10) Patent No.: US 8,948,499 B1
(45) Date of Patent: Feb. 3, 2015

(54) METHOD FOR ONLINE LEARNING AND RECOGNITION OF VISUAL BEHAVIORS

(75) Inventors: Swarup Medasani, Thousand Oaks, CA (US); David L. Allen, Thousand Oaks, CA (US); Suhas E. Chelian, Encino, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 717 days.

(21) Appl. No.: 12/962,548

(22) Filed: Dec. 7, 2010

(51) Int. Cl.
*G06K 9/62* (2006.01)

(52) U.S. Cl.
USPC ............ 382/159; 382/155; 382/156; 382/224

(58) Field of Classification Search
CPC .......... G06K 9/00335; G06K 9/00771; G06K 9/00778; G06K 9/00785; G06K 9/00624; G06K 2009/00738
See application file for complete search history.

(56) References Cited

U.S. PATENT DOCUMENTS

| | | | |
|---|---|---|---|
| 7,558,762 | B2 | 7/2009 | Owechko et al. |
| 7,672,911 | B2 | 3/2010 | Owechko et al. |
| 2005/0201591 | A1* | 9/2005 | Kiselewich .................... 382/104 |
| 2010/0061624 | A1* | 3/2010 | Cobb et al. .................... 382/157 |

OTHER PUBLICATIONS

Medasani et al., "Behavior recognition using cognitive swarms and fuzzy graphs", Apr. 30, 2007, Proc. SPIE 6560, Intelligent Computing: Theory and Applications V, 656005, vol. 6560, p. 656005-1-656005-9.*

Khosla et al., "A bio-inspired system for spatio-temporal recognition in static and video imagery", Apr. 9, 2007, Proc. SPIE 6560, Intelligent Computing: Theory and Applications V, 656002, vol. 6560, p. 656002-1-656002-8.*

Oliver et al., "A bayesian computer vision system for modeling human interactions", Aug. 2000, IEEE Transactions on Pattern Analysis and Machine Intelligence, vol. 22, iss. 8, p. 831-843.*

Carpenter, "Default Artmap", Apr. 2003, IJCNN'03, Technical Report CAS/CNS-2003-008, p. 1-6.*

Khosla et al., "Bio-inspired method and system for actionable intelligence", May 19, 2009, Proc. SPIE 7352 Intelligent Sensing, Situation Management, Impact Assessment and Cyber-Sensing, vol. 7352, p. 735201-1-735201-11.*

D. Nister and H. Stewenius, "Scalable recognition with a vocabulary tree," In Proc. CVPR, vol. 5, 2006.

(Continued)

*Primary Examiner* — Stephen R Koziol
*Assistant Examiner* — Timothy Choi
(74) *Attorney, Agent, or Firm* — Tope-McKay & Associates

(57) ABSTRACT

Described is a system for object and behavior recognition which utilizes a collection of modules which, when integrated, can automatically recognize, learn, and adapt to simple and complex visual behaviors. An object recognition module utilizes a cooperative swarm algorithm to classify an object in a domain. A graph-based object representation module is configured to use a graphical model to represent a spatial organization of the object within the domain. Additionally, a reasoning and recognition engine module consists of two sub-modules: a knowledge sub-module and a behavior recognition sub-module. The knowledge sub-module utilizes a Bayesian network, while the behavior recognition sub-module consists of layers of adaptive resonance theory clustering networks and a layer of a sustained temporal order recurrent temporal order network. The described invention has applications in video forensics, data mining, and intelligent video archiving.

15 Claims, 7 Drawing Sheets

(56) References Cited

OTHER PUBLICATIONS

S. Medasani and R. Krishnapuram, "Graph Matching by Relaxation of fuzzy assignments," IEEE Transactions on Fuzzy Systems, 9(1), 173-183, Feb. 2001.

R. Krishnapuram, S. Medasani, S. Jung and Y. Choi, "Content-Based Image Retrieval Based on a Fuzzy Approach," IEEE Transactions on Knowledge and Data Engineering (TKDE), Oct. 2004.

N. Oliver and A. Pentland, "Graphical. models for driver behavior recognition in a smart car," Proc. of IV2000.

K. Sato and J.K. Aggarwal, "Temporal spatio-velocity transform and its application to tracking and interaction," CVIU 96(2004), 100-128.

S. Hongeng, R. Nevatia, and F. Bremond, "Video-based event recognition: activity representation and probabilistic recognition methods," CVIU 96(2004), 129-162.

Medioni, I. Cohen, F. Bremond, S. Hongeng, R. Nevatia, "Event detection and analysis from video streams," IEEE PAMI 23(8), 2001, 873-889.

N. Oliver, A. Garg, and E. Horvitz, "Layered representations for learning and inferring office activity from multiple sensory channels," CVIU 96(2004), 163-180.

A. Amir, S. Basu, G. Iyengar, C. Lin, M. Naphade, J.R. Smith, S. Srinivasa, and B. Tseng, "A multi-modal system for retrieval of semantic video events," CVIU 96(2004), 216-236.

R.T. Collins, A. J. Lipton, and T. Kanade, "Introduction to the special section on video surveillance," IEEE-PAMI, 22(8), Aug. 2000.

N. Oliver, B. Rosario, and A. Pentland, "A Bayesian computer vision system for modeling human interactions," IEEE-PAMI, 22(8), Aug. 2000.

J.C. Bezdek, Pattern Recognition with Fuzzy Objective Function Algorithms, Plenum Press, New York, 1981.

M.P. Windham, "Numerical classification of proximity data with assignment measure," Journal of Classification, vol. 2, pp. 157-172, 1985.

S. Gold and A. Rangarajan, "A graduated assignment algorithm for graph matching," IEEE Transaction on Pattern Analysis and Machine Intelligence, vol. 18, pp. 377-387, Apr. 1996.

Z. Zhang, "A flexible new technique for camera calibration," IEEE Transactions on Pattern Analysis and Machine Intelligence, 22(11): 1330-1334, 2000.

Jean-Yves Bouguet, "Camera Calibration Toolbox for Matlab," http://www.vision.caltech.edu/bouguetj/calib_doc/.

Intel OpenCV Computer Vision Library (C++), http://www.intel.com/research/mrl/research/opencv/.

Giorgio Carpaneto, Paolo Toth, "Algorithm 548: Solution of the assignment problem [H]," ACM Transactions on Mathematical Software, 6(1): 104-111, 1980.

I. Hartley, A. Zisserman, "Multiple view geometry in computer vision," Cambridge University Press, Cambridge, UK 2000.

Longuet-Higgins, "A computer algorithm for reconstructing a scene from two projections" Nature, 293: 133-135, Sep. 1981.

T. Kailath, et al., "Linear Estimation," Prentice Hall, NJ, ISBN 0-13-022464-2, 854pp, 2000.

P. Saisan, "Modeling of Pedestrian Motion for recognition," IS&T/SPIE 17th annual symposium, San Jose, CA 2005.

A.R. Dick, et al., "Combining Single view recognition and multiple view stereo for architectural scenes," International Conference on Computer Vision (ICCV'01) vol. 1, Jul. 7-14, 2001, Vancouver, B.C., Canada.

G. Shakhanarovich, et al. "Integrated face and gait recognition from multiple views," In Proceedings of the IEEE Conference on Computer Vision and Pattern Recognition, Dec. 2001, Kauai, Hawaii.

Sujit Kuthirummal, et al., "Planar shape recognition across multiple views," In Proceedings of the Interationa Conference on Pattern Recognition (ICPR)—2002, Quebec, Canada.

Sujit Kuthirummal, et al., "Multiview constraints for recognition of planar curves in fourier domain," Proceedings of the Indian Conference on Vision Graphics and Image Processing (ICVGIP)—2002.

A. Selinger and R.C. Nelson, "Appearance-based object recognition using multiple views," In Proceedings of the IEEE Conference on Computer Vision and Pattern Recognition—Dec. 2001, Kauai, Hawaii.

D.L. Swets, et al., "Genetics Algorithms for Object Recognition in a complex scene," Proc. of Intl. Conference on Image Processing, vol. 2, Oct. pp. 23-26, 1995.

V. Ciesielski and M. Zhang, "Using Genetic Algorithms to Improve the Accuracy of Object Detection," In Proceedings of the third Pacific-Asia Knowledge Discovery and Data Mining Conference, Ning Zhong and Lizhu Zhou (Eds.), Knowledge Discovery and Data Mining—Research and Practical Experiences. Tsinghua University Press, p. 19-24. Beijing, China, Apr. 26-31, 1999.

Kennedy, J., Eberhart, R. C., and Shi, Y., Swarm Intelligence San Francisco: Morgan Kaufmann Publishers, 2001, Chapter 7 ("The Particle Swarm"), pp. 287-318.

R.C. Eberhart, et al., "Particle swarm optimization: Developments, applications, and resources," Proceedings of IEEE Congress on Evolutionary Computation (CEC 2001), Korea, 2001.

R. Brits, et al., "A Niching Particle Swarm Optimizer," 2002.

F. Rojas, I. Rojas, R. M. Clemente, and C.G. Puntoner, "Nonlinear blind source separation using genetic algorithms," In Proceedings of International Conference on Independent Component Analysis, 2001.

D. Beasley, D. R. Bull, and R. R. Martin, "A Sequential Niching Technique for Multimodal Function Optimization," Evolutionary Computation, 1(2), p. 101-125, 1993.

R. Krishnapuram and J. M. Keller, "Quantative Analysis of Properties and Spatial Relations of Fuzzy Image Regions," Transactions on Fuzzy Systems, 1(2):98-110, 1993.

Y. Owechko, S. Medasani, and N. Srinivasa, "Classifier Swarms for Human Detection in infrared imagery," Proc. of the CVPR workshop on Object Tracking and Classification Beyond the Visible Spectrum (OTCBVS'04) 2004.

Y. Owechko, et al., "Vision-Based Fusion System for Smart Airbag Applications," Intelligent Vehicle Symposium, 2002. IEEE, Publication Date: Jun. 17-21, 2002, vol. 1, on pp. 245-250 vol. 1.

Y. Owechko and S. Medasani, "A Swarm-based Volition/Attention Framework for Object Recognition," IEEE Conference on Computer Vision and Pattern Recognition, San Diego, Proc. of CVPR-WAPCV 2005.

Y. Owechko and S. Medasani, "Cognitive Swarms for Rapid Detection of Objects and Associations in Visual Imagery," IEEE Swarm Intelligence Symposium, Pasadena, 2005.

P. Saisan, S. Medasani, and Y. Owechko "Multi-View Classifier Swarms for Pedestrian Detection and Tracking," IEEE Conference on Computer Vision and Pattern Recognition, San Diego, 2005.

N. Srinivasa, et al., "Fuzzy edge-symmetry features for enhanced intruder detection," 11th International Conference on Fuzzy Systems, FUZZIEEE 2003.

F. Orabona, G. Metta, and G. Sandini, "Object-based Visual Attention: A Model for a Behaving Robot," In 3rd International Workshop on Attention and Performance in Computational Vision (in CVPR 2005), San Diego, CA, Jun. 2005.

B. J. Scholl, "Objects and Attention: The State of the Art," Cognition 80: 1-46, 2001.

Y. Sun and R. Fisher, "Hierarchical Selectivity for Object-based Visual Attention," submitted to Artificial Intelligence, 2004.

Liao, Wenhul and Ji, Qiang 2006, "Efficient Active Fusion for Decision-making via VOI Approximation," In Proc. AAAI 2006, 1180-1185.

Jaynes, C., Stolle, F., and Collins, R., "Task Driven Perceptual Organization for Extraction of Roofop Polygons," Proceedings of the Arpa Image Understanding Workshop, Monterey, California (Morgan Kaufmann Publishers, San Francisco, 1994), pp. 359-365.

A. Huertas, and R. Nevatia, "Detecting Changes in Aerial Views of Man-Made Structures," IVC200.

R. Mendes, "The Fully Informed Particle Swarm: Simpler, Maybe Better," Special issue of IEEE Trans. on Evol. Computation on Particle Swarm Optimization, vol. 8, No. 3, Jun. 2004.

(56) References Cited

OTHER PUBLICATIONS

K.E. Parsopoulos, et al. "On the Computation of All Global Minimizers Through Particle Swarm Optimization," Special issue of IEEE Trans. on Evol. Computation on Particle Swarm Optimization, vol. 8, No. 3, Jun. 2004.

F. van der Bergh, et al., "A Cooperative Approach to Particle Swarm Optimization," Special issue of IEEE Trans. on Evol. Computation on Particle Swarm Optimization, vol. 8, No. 3, Jun. 2004.

A. Ratnaweera, "Self-Organizing hierarchical particle Swarm Optimizer with Time-Varying Acceleration Coefficients," Special issue of IEEE Trans. on Evol. Computation on Particle Swarm Optimization, vol. 8, No. 3, Jun. 2004.

C.A. Coello, "Handling Multiple Objectives With Particle Swarm Optimization," Special issue of IEEE Trans. on Evol. Computation on Particle Swarm Optimization, vol. 8, No. 3, Jun. 2004.

L. Messerschmidt, et al., "Learning to Play Games Using a PSO-Based Competitive Learning Approach," Special issue of IEEE Trans. on Evol. Computation on Particle Swarm Optimization, vol. 8, No. 3, Jun. 2004.

M.P. Wachwiak, et al., "An Approach to Multimodal Biomedical Image Registration Utilizing Particle Swarm Optimization," Special issue of IEEE Trans. on Evol. Computation on Particle Swarm Optimization, vol. 8, No. 3, Jun. 2004.

R. Hassan, B. Cohanim, and O. de Weck, "A Comparison of Particle Swarm Optimization and the Genetic Algorithm," AIAA Conference, 2005.

J.F. Schutte, J.A. Reinbolt, B.j. Fregly, R.T. Haftka, and A.D. George, "Parallel Global Optimization with the Particle Swarm Algorithm," Int. J. Numerical methods in Engineering, 61: 2296-2315, 2004.

J. Kennedy and W.M. Spears, "Matching Algorithms to Problems: An Experimental Test of the Particle Swarm and Some Genetic Algorithms on the Multimodal Problem Generator," Proceedings of IEEE Inter. Conf. on Evolutionary Computation, 78-83, 1998.

Bradski, G. and S. Grossberg (1995), "Fast learning VIEWNET architectures for recognizing 3-D objects from multiple 2-D views," Neural Networks 8, 1053-1080.

Charniak, E. (1991), "Bayesian networks without tears," AI Magazine 12, 50-63.

Hu, W., D. Xie, et al. (2004), "Learning activity patterns using fuzzy self-organizing neural network," IEEE Transactions on Systems, Man, and Cybernetics—Part B: Cybernetics 34, 1618-1626.

Lazebnik, S., C. Schmid, et al. (2006), "Beyond bags of features: Spatial pyramid matching for recognizing natural scene categories," IEEE Conference on Computer Vision and Pattern Recognition, New York, NY.

Lowe, D. (1999), "Object recognition from local scale-invariant features," International Conference on Computer Vision, Corfu, Greece.

Medasani, S. and Y. Owechko (2007), "Behavior recognition using cognitive swarms and fuzzy graphs," SPIE Defense and Security Symposium, Orlando, FL.

S. Medasani, and Y. Owechko, "Possibilistic Particle Swarms for Optimization," Proceedings 5673 of SPIE/IST Symposium on Electronic Imaging, San Jose, 2005.

Park, S. and J. Aggarwal (2003), "A hierarchical Bayesian network for event recognition of human actions and interactions," ACM SIGMM International Workshop on Video Surveillance, Berkely, CA.

Barbara Zitova and Jan Flusser, "Image registration methods: a survey," Image and Vision Computing 21, pp. 977-1000, 2003.

B. Bhanu, et al., "Adaptive Image Segmentation Using a Genetic Algorithm," IEEE Transactions on Systems, Man, and Cybernetics, vol. 25, No. 12, Dec. 1995.

Khosla, D., Moore, C., and Chelian, S. (2007). A Bioinspired system for spatio-temporal recognition in static and video imagery. Proceedings of SPIE, 6560: 656002.

Judea Pearl, et al., "Bayesian Networks," Handbook of Brain Theory and Neural Networks, Technical Report, R-277, Nov. 2000.

Avrim Blum (1996), "On-Line Algorithms in Machine Learning", in Proceedings of the Workshop on On-Line Algorithms.

Notice of Allowability for U.S. Appl. No. 11/433,159.
Reply to Notice of Allowance for U.S. Appl. No. 11/433,159.
Notice of Allowability for U.S. Appl. No. 10/918,336.
Notice of Allowability for U.S. Appl. No. 11/800,265.
Notice of Allowability for U.S. Appl. No. 11/367,755.
Notice of Allowability for U.S. Appl. No. 11/385,983.

\* cited by examiner

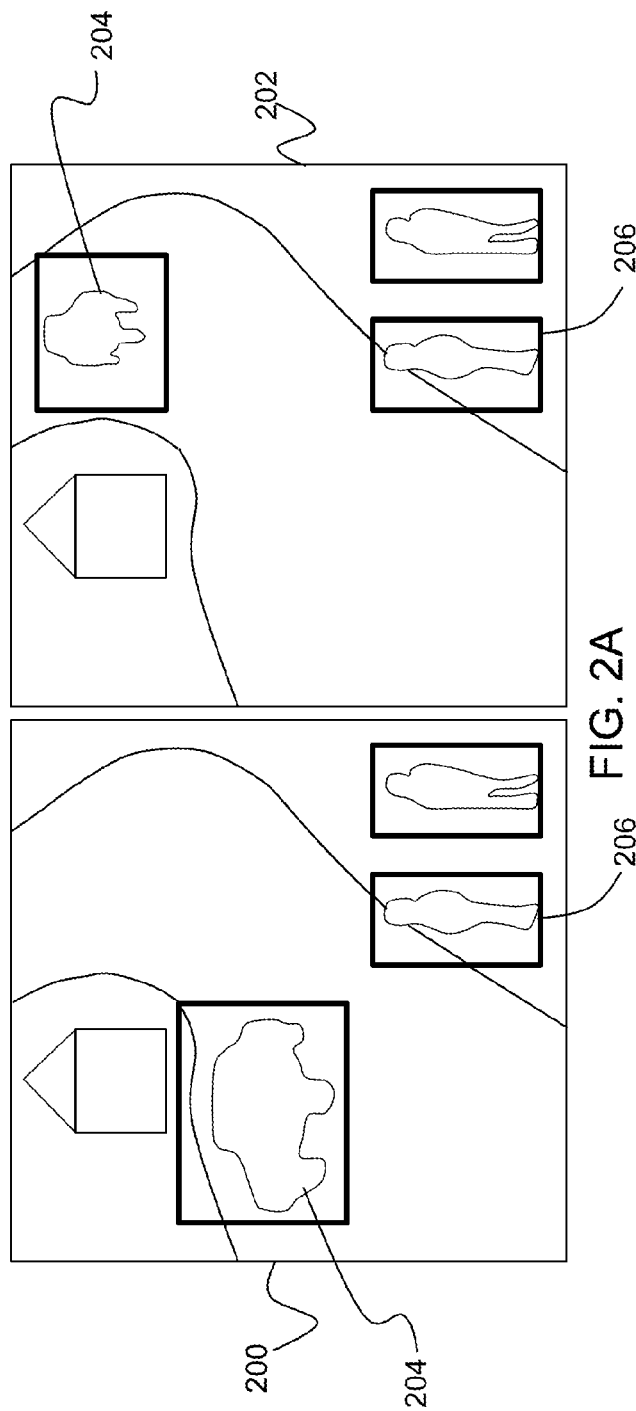
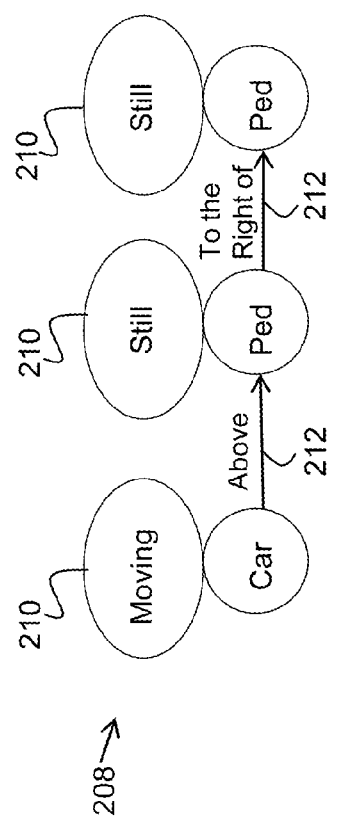

METHOD FOR ONLINE LEARNING AND RECOGNITION OF VISUAL BEHAVIORS

BACKGROUND OF THE INVENTION (1) Field of Invention

The present invention relates to a system for object and behavior recognition and, more particularly, to a multi-modular system which integrates modules for object detection, scene matching, and behavior recognition.

(2) Description of Related Art

Visual behavior recognition systems have numerous applications, such as automatic visual surveillance, human-computer interaction, and video indexing/retrieval. Several visual behavior recognition systems exist that rely solely on Bayesian networks, such as that described by Park et al. in "A Hierarchical Bayesian Network for Event Recognition of Human Actions and Interactions," at the ACM SIGMM International Workshop on Video Surveillance, Berkeley, Calif., 2003. Alternatively, Hu et al. described visual behavior recognition systems which rely on neural networks alone, in "Learning Activity Patterns Using Fuzzy Self-Organizing Neural Network" in IEEE Transactions on Systems, Man, and Cybernetics—Part B: Cybernetics, 2004. The systems described by Park et al. and Hu et al. are limited by initial domain knowledge and the inability to easily incorporate domain knowledge, respectively. In addition, features such as video forensics, data mining, and intelligent video archiving may not be explicitly included in the aforementioned behavior recognition systems.

Prior art in the visual behavior recognition field does not consider system integration. Instead, the prior art focuses on object detection alone, scene matching alone, or behavior recognition alone. Such modules were described by Lowe in "Object Recognition from Local Scale-Invariant Features," as presented at the International Conference on Computer Vision, Corfu, Greece, 1999, and Lazelbnik et al. in "Beyond Bags of Features: Spatial Pyramid Matching for Recognizing Natural Scene Categories" as presented at the IEEE Conference on Computer Vision and Pattern Recognition, New York, N.Y. Similar modules were also described by Park et al. and Hu et al., as referenced above.

Because the prior art does not consider system integration, the prior art is limited in its inability to automatically recognize, learn, and adapt to simple and complex visual behaviors. Thus, a continuing need exists for a system which integrates object and behavior recognition and is not limited by initial domain knowledge.

SUMMARY OF THE INVENTION

The present invention relates to an integrated multi-modular system for object and behavior recognition system. An object recognition module comprises a plurality of software agents configured to operate as a cooperative swarm to classify an object in a domain. A graph-based object representation module is configured to use a graphical model to represent the spatial organization of the object within the domain. Furthermore, the system comprises a reasoning and recognition engine module comprising a knowledge sub-module and a behavior recognition sub-module. The knowledge sub-module is configured to store a set of known object behaviors to allow the system to recognize the set of known object behaviors, while the behavior recognition sub-module is configured to learn both the set of known object behaviors and a set of novel object behaviors. A behavior classification for the object is output, wherein the behavior classification for the object is classified as a known object behavior or as a novel object behavior based on comparison to a predetermined threshold value.

In another aspect, the knowledge sub-module is a Bayesian network.

In another aspect, the knowledge sub-module is connected with the behavior recognition sub-module, such that the behavior recognition sub-module learns the set of known behaviors and proposes a set of learned new behaviors back to the knowledge sub-module as a set of novel behaviors.

In yet another aspect, fuzzy attributed relational graphs provide an input for the reasoning and recognition engine module.

In another aspect, the Bayesian network is a Hidden Markov Model.

In another aspect, the knowledge sub-module is a Hidden Markov Model.

As can be appreciated by one in the art, the present invention also comprises a method for causing a processor to perform the operations described herein.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where:

FIG. 2A is an illustration of two scenes of events according to the present invention;

FIG. 2B is a graphical illustration of a Fuzzy Attributed Relational Graph (FARG) for representing events according to the present invention;

DETAILED DESCRIPTION

Figure 1:
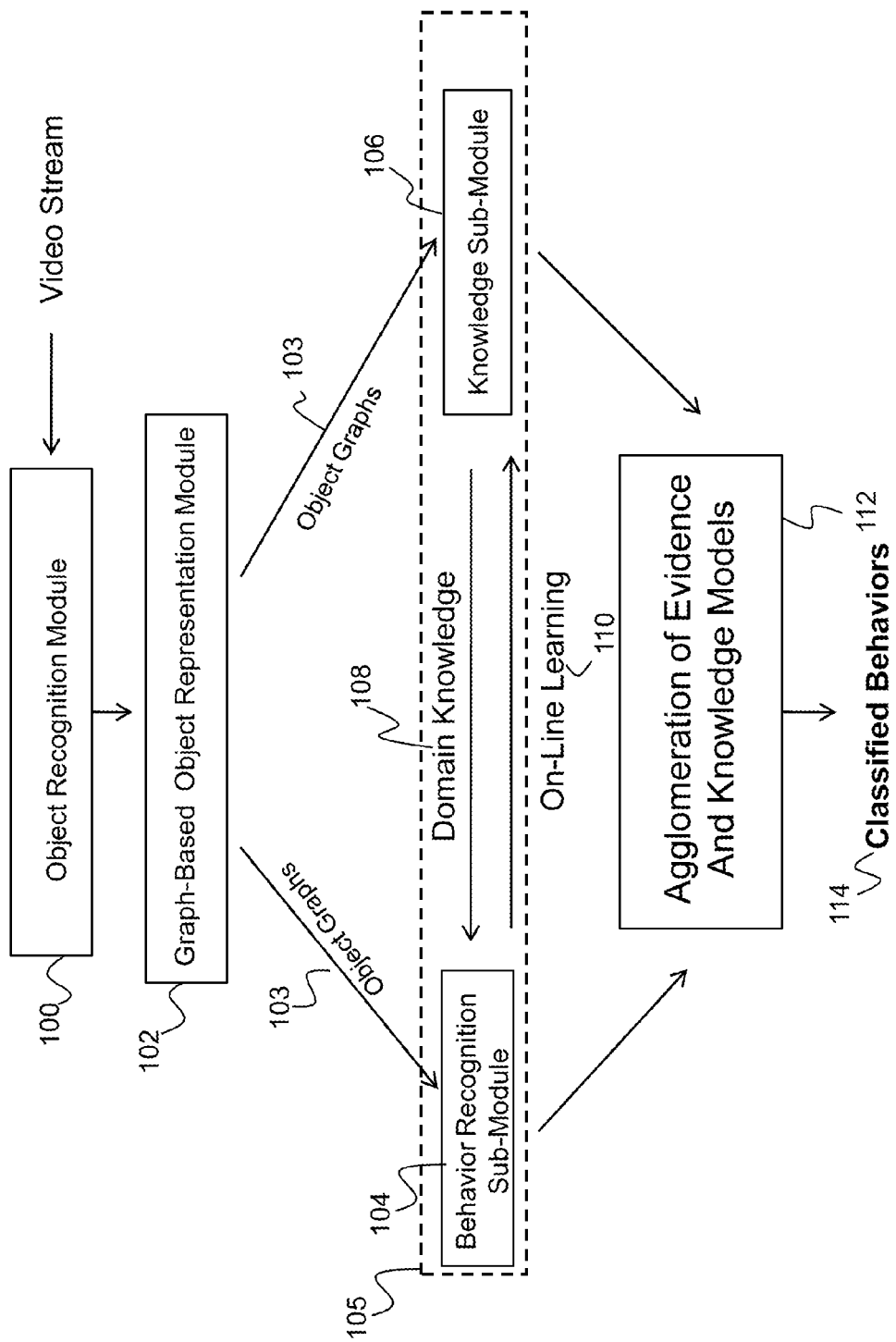
FIG. 1 illustrates a flow diagram of a system for object and behavior recognition according to the present invention.

The present invention relates to a system for object and behavior recognition and, more particularly, to a multi-modular system for object and behavior recognition which integrates modules for object detection, scene matching, and behavior recognition. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for object and behavior recognition. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for object and behavior recognition, typically in the form of software, operated using a data processing system (computer or computer network). The third principal aspect is a computer program product. The computer program product generally represents computer-readable instruction means stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive. These aspects will be described in more detail below.

(2) Introduction

A purpose of the present invention is to provide an accurate, flexible, and scalable video analysis system that can automatically process, analyze, and summarize high-level surveillance content in both live video and video archives. The present invention accomplishes this as a visual behavior recognition system (VBRS) that can automatically recognize, learn, and adapt to simple and complex visual behaviors. The VBRS is a system comprising a collection of modules. The modules can be used independently for various aspect of the visual behavior recognition problem or can be sequenced together for an end-to-end visual behavior recognition system. As a non-limiting example, the present invention may be utilized as an end-to-end system for visual behavior recognition that combines existing and innovative implementation of various modules to develop a system concept for visual behavior recognition.

Although there are other implementations of several of the modules in VBRS, they suffer from several limitations, and system integration is often not considered. Overall, VBRS can be viewed as combination of object and scene recognition modules feeding into recognition and reasoning engines which use domain knowledge and on-line learning. The present invention is a comprehensive solution that combines efficient representation schemes, which preserve uncertainty until decisions are made, along with an oracle-learned configuration to learn and adapt over time. While VBRS is designed as a vision-based system, the present invention could also use non-visual data (e.g., radar, AIS, or text) provided that the inputs can be recognized and located as individual tokens or objects in a document or scene. Beyond that stage, all aspects of VBRS are also applicable to non-visual systems.

The VBRS uses a combination of algorithms to identify and recognize visual behavior. For example, cognitive swarm-based algorithms are utilized for efficient searching and detection of objects (e.g., humans, vehicles). Furthermore, fuzzy graph models, such as Fuzzy Attributed Relational Graphs (FARGs), are implemented for complex relationship representation. Finally, Bayesian networks (BNs) and ARTSTORE networks (ASNs) provide a reasoning module of the system. An ASN architecture consists of Adaptive Resonance Theory (ART) clustering networks and a Sustained Temporal Order Recurrent (STORE) temporal order network, as will be described in further detail below.

Cognitive swarms for object detection have been implemented in a software application described in U.S. Pat. No. 7,636,700 (hereinafter referred to as the '700 patent), entitled, "Object Recognition System Incorporating Swarming Domain Classifiers", which is hereby incorporated by reference as though fully set forth herein. The software application described in the '700 patent has been shown to automatically detect objects in video streams despite partial occlusion, discontinuous tracks, or camera adjustment. Therefore, the '700 patent addresses a first limitation of current surveillance systems having a fixed camera angle or zoom. Additionally, FARGs, BNs, and ASNs can automatically recognize, learn, and adapt to simple and complex visual behaviors, which may, or may not, involve multiple objects. Thus, the inclusion of FARGs, BNs, and ASNs in the present invention addresses additional limitations of current surveillance systems which model only simple or fixed behavioral patterns and/or require excessive user interaction. Furthermore, as a system, VBRS provides video forensics, data mining, and intelligent video archiving features beyond its original components.

(3) Specific Details

A flow diagram representing the overall architecture of the VBRS system described herein is illustrated in FIG. 1. As shown in FIG. 1, objects in a video stream are first detected with an object recognition module 100 utilizing cognitive swarm-based algorithms (i.e., classifier swarm). While other conventional object recognition methods could also be used, the VBRS system is more efficient using cognitive swarm-based algorithms. The object recognition module 100 includes a plurality of software agents, or particles, configured to operate as a cooperative swarm to classify an object in a domain, or scene.

Classifier swarms are an approach to visual recognition of objects in an image that combine feature-based object classification with efficient search mechanisms based on swarm intelligence. Each particle in the swarm is a self-contained classifier that moves through the solution space seeking the most "object-like" regions. This approach is a much more efficient method for finding objects in an image compared to searching based on scanning the image or using gradient information. The classifier swarm approach aids in increasing the range of applications for vision systems by dramatically reducing computational requirements, eliminating the need for cueing sensors, such as radar, and reducing overall cost of practical systems.

The '700 patent discloses a system where each particle is a self-contained image classifier which can modify its own properties in order to find objects. Additional details regarding the use of cognitive swarms as classifiers can be found in U.S. Pat. No. 7,599,894 entitled, "Object Recognition Using a Cognitive Swarm Vision Framework with Attention Mechanisms", which is also hereby incorporated by reference as though fully set forth herein.

As depicted in FIG. 1, after detection and recognition of at least one object with the object recognition module 100, a graph-based object representation module 102 is configured to use a graphical model, or object graph 103, to represent the spatial organization of the object within the domain. The term "domain" refers to any searchable dimension in a solution space, non-limiting examples of which include spatial coordinates, scale, frequency, time, Doppler shift, time delay, wave length, and phase. In a desired aspect, the present invention uses fuzzy attributed relational graph (FARG) structures, directed graphs with fuzzy labels, to describe the spatial organization of object groups. Graphs of various types have been widely used as representational tools in many applications, such as object recognition, knowledge representation, and scene description. FARGs are a powerful way to model the inherent uncertainty in several of the above domains. U.S. Pat. No. 7,672,911 (hereinafter referred to as the '911 patent), entitled, "Graph-based cognitive swarms for object group recognition in a 3N or greater dimensional solution space", describes the use of FARGs for object recognition. The '911 patent is hereby incorporated by reference as though fully set forth herein.

To further describe the use of FARGS in the present invention, FIG. 2A illustrates a set of scenes 200 and 202 depicting a moving vehicle 204 and pedestrians 206. In a first scene 200, the vehicle 204 is at one location on a road. In a second, later scene 202, the moving vehicle 204 has driven further along the road. A graphical illustration of a temporal FARG 208 representing the events in the scenes 200 and 202 is shown in FIG. 2B. Nodes and links in FARG-directed graphs have fuzzy values that allow a robust continuous representation of relationships using intuitive descriptors such as "above" or "to the right of". Each node 210 in the FARG 208 represents an image region and each link 212 (or edge) represents a relation between two regions. Thus, referring to FIG. 2B, the nodes 210 are the moving car and the still pedestrians (i.e., "Ped"). The links 212 are the relations between the moving car and still pedestrians (i.e., "Above" and "To the Right of") shown in the scenes 200 and 202 of FIG. 2A.

The fuzzy graph matching (FGM) algorithm quickly and efficiently performs complex event detection by finding subgraphs that match an event model in larger graphs that represent a video scene. FARGs provide flexible event representation and efficient detection of simple spatial and temporal events represented by sub-graphs. The FGM finds sub-graphs in the scene that match simple event models, such as a person exiting a car and moving away from it. Another example of a simple event model would be several people meeting and moving as a group. Temporal FARGs representing complex events are then created at a higher layer from simple event FARGs. The FGM is used again in this layer to detect complex events by finding subgraphs that match complex event models. To be contrasted with a simple event model which is defined as interactions between a small number of objects, complex event models represent higher level events that consist of combinations of simple events in a hierarchical framework.

Figure 3:
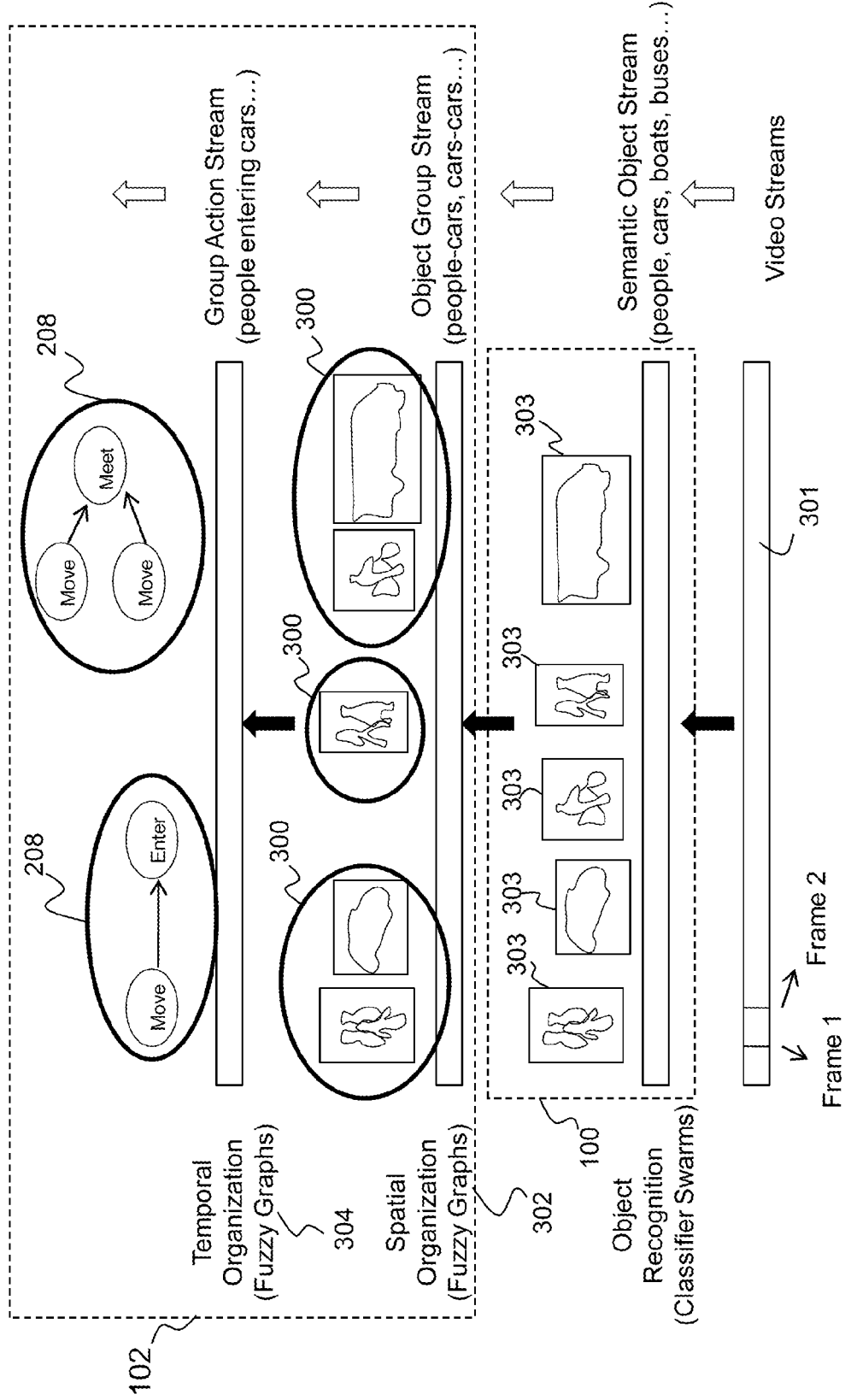
FIG. 3 is an illustration of temporal FARGs built from simple event FARGs according to the present invention.

FIG. 3 illustrates an overview of the graph-based object representation module 102, demonstrating temporal FARGs 208 built from simple event FARGs 300. Object recognition 100 is performed automatically by classifier swarms which detect objects in a video stream 301 as described above. In a desired aspect, object recognition 100 is performed by classifier swarms as described in the '700 patent or any other suitable object recognition system. Single objects 303 are detected in the object recognition 100 step, non-limiting examples of which include people, cars, boats, and buses. Next, during a spatial organization step 302 of the graph-based object representation module 102, simple event FARGs 300 are created to represent visual scenes from the video stream in graphical form. The simple event FARGs 300 may include, but are not limited to, object groups such as people-car groups or car-car groups. Finally, in a temporal organization step 304, temporal FARGs 208 representing complex events are created from the simple event FARGs 300 created in the spatial organization step 302. Complex events include, but are not limited to, events such as people entering cars.

Referring back to FIG. 1, object graphs 103 (i.e., event or temporal FARGs) provide an input into a recognition and reasoning engine module 105. The reasoning and recognition engine module 105 includes a knowledge sub-module 106 and a behavior recognition sub-module 104. Behavior recognition is described by Bradski, G. and Grossberg, S. (1995) in "Fast learning VIEWNET architectures for recognizing 3-D objects from multiple 2-D views" in Neural Networks, 8, 1053-1080. A rough implementation using the above technology for behavior recognition was presented by Khosla, D. Moore, C., and Chelian, S. (2007) in "A Bioinspired system for spatio-temporal recognition in static and video imagery" in Proceedings of SPIE, 6560: 656002. The references above are hereby incorporated by reference as though fully set forth herein.

In a desired aspect and as depicted in FIG. 1, the knowledge sub-module 106 is a Bayesian network, and the behavior recognition sub-module 104 is an ARTSTORE network. These representation schemas preserve uncertainty until decisions are made. The recognition and reasoning engine module 105 can recognize behavioral events as well as learn to adapt by combining ARTSTORE networks and Bayesian networks in an oracle-learner topology.

Bayesian networks (BNs) combine graphical models and probability theory in order to efficiently represent and reason about joint probability distributions while preserving the prevalent uncertainty. BNs have been heavily used in decision making, reasoning about and modeling complex processes, and diagnostics and prognostics. BNs allow known behaviors, both good and bad, to be modeled and then reasoned about while still being adaptable and updatable as new knowledge and data are acquired.

The knowledge sub-module 106 (e.g., Bayesian network) in this system acts as the oracle, since it is embedded with most of the a priori information, or domain knowledge 108 about a typical behavior. The knowledge sub-module 106 teaches the behavior recognition sub-module 104 (e.g., ARTSTORE network) to represent and recognize the object behavior. With time, the behavior recognition sub-module 104 is capable of proposing new object behaviors for supervised incorporation, or online learning 110, into the knowledge sub-module 106. The agglomeration of evidence and knowledge models 112 from the behavior recognition sub-module 104 and knowledge sub-module 106, respectively, allows the output of classified behaviors 114. The output is classification of an input object behavior as one of the stored object behaviors or, alternatively, as a new or abnormal behavior, which then creates a new behavior class or category. In a desired aspect, the output is a class label and time stamp. A predetermined threshold value is set for the dissimilarity of a current input event to a stored event. N number of attributes from an event can be used to map the event into an N dimensional space. As a non-limiting example, the Euclidean distance metric can then be used to determine if a new event is similar to existing events. The Euclidean distance can be normalized between 0 and 1 and a threshold value of 0.75 can be used to determine if the events are similar. If the dissimilarity is greater than the predetermined threshold value, the current event is determined to be abnormal or novel. Thus, the integration of event representation, reasoning, and learning allows good initial results based on domain knowledge while allowing robust adaptation over time.

Figure 4:
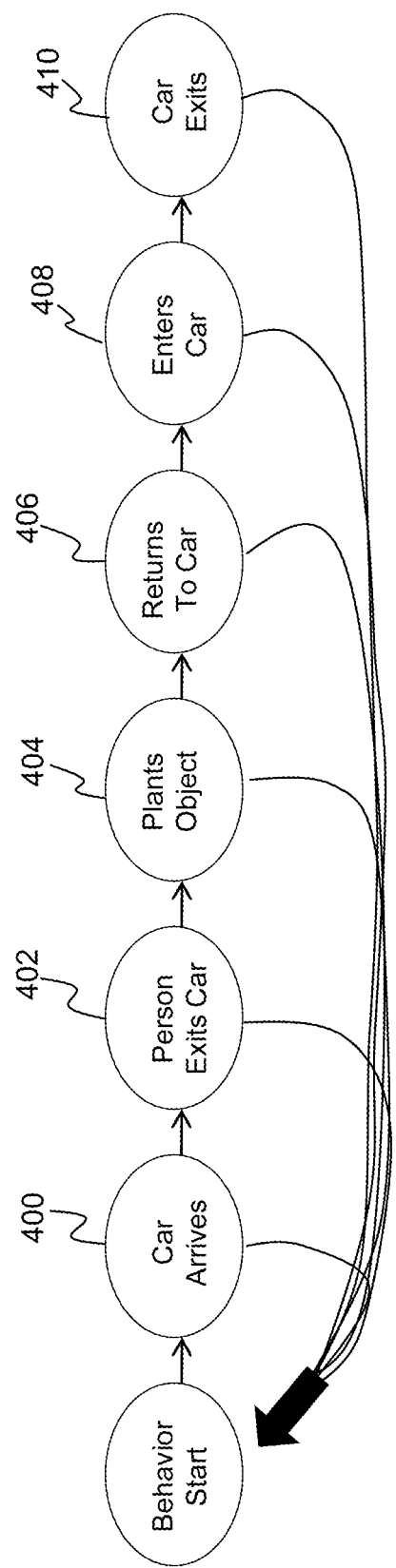
FIG. 4 is a Hidden Markov Model represented as a state transition diagram of a behavior according to the present invention.

Hidden Markov Models (HMMs) are one non-limiting example of dynamic BNs which model processes assumed to have the Markov property. The Markov property is a property that states that the likelihood of a given future state, at any given moment, depends only on its present state, and not on any past states. HMMs model the change in hidden states over time through observable parameters. A non-limiting example of a HMM is illustrated in FIG. 4, which depicts possible behavior state transitions of the system during an object placement behavior. The behavior states include (1) a car arriving 400, (2) a person exiting the car 402, (3) the person planting an object 404, (4) the person returning to the car 406, (5) the person entering the car 408, and (6) the car exiting 410. The actual state of the system may not be observable in a video. For instance, the car may be occluded behind a building. However, the advantage of using a HMM in the present invention is that it can compute the posterior probabilities of the hidden states of the system based on any subset of observed evidence. Hence, even if the car is not observed, the behavior can still be detected based on the sequence of other observations.

BNs and HMMs allow for the understandable representation of expert domain knowledge. In the present invention, they store the a priori domain information about known behaviors and allow the system to recognize these known behaviors initially. Furthermore, as illustrated in FIG. 1, the knowledge sub-module 106 (e.g., BN or HMM) is connected with the behavior recognition sub-module 104 (e.g., ARTSTORE network) as an oracle, such that the behavior recognition sub-module 104 will learn known behaviors more quickly by receiving reinforcement feedback 108 based on its domain knowledge. Then, as the behavior recognition sub-module 104 learns novel behaviors, the behaviors can be proposed back to the knowledge sub-module 106 as new behaviors derived from online learning 110.

Figure 5:
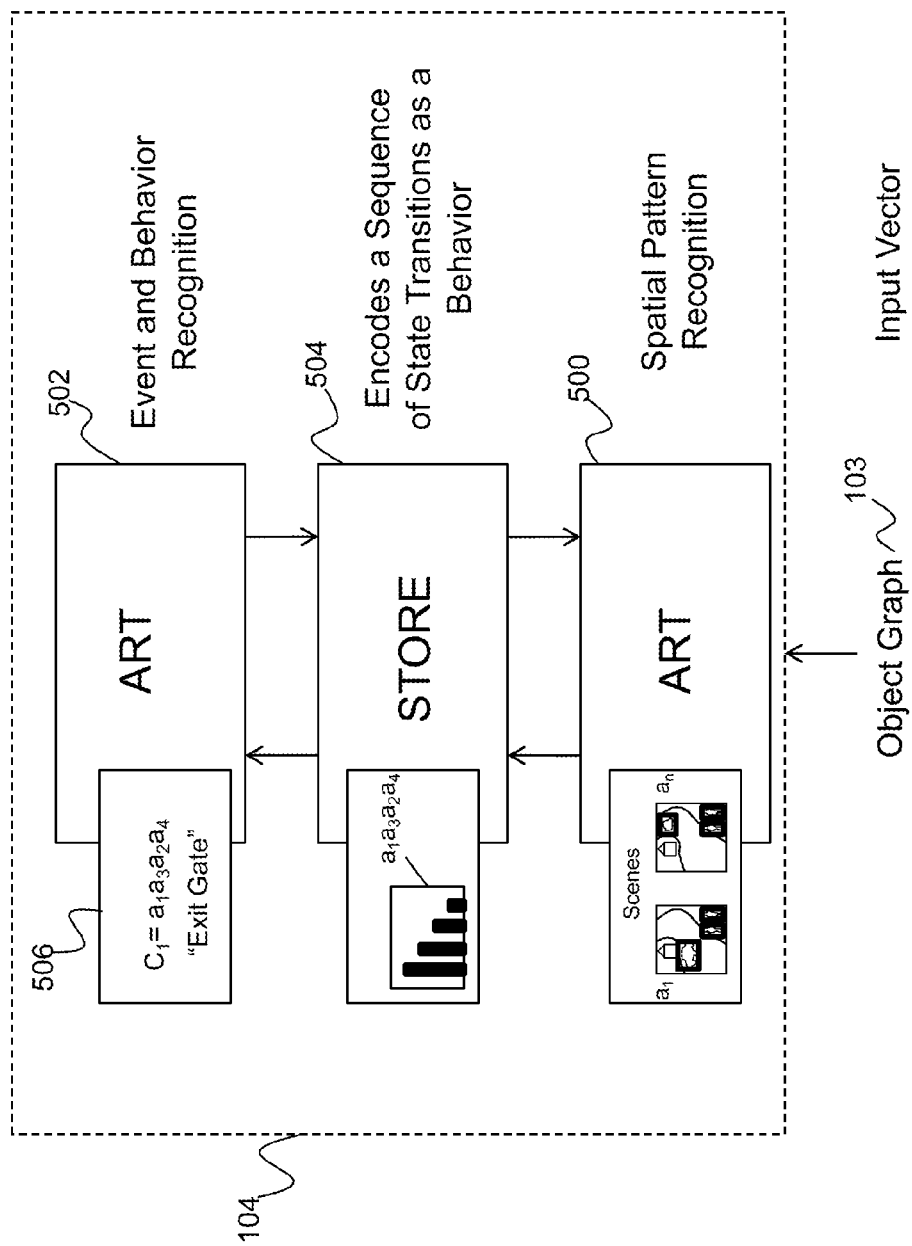
FIG. 5 is an illustration of Adaptive Resonance Theory (ART) clustering networks and a Sustained Temporal Order Recurrent (STORE) temporal order network, also known as an ARTSTORE architecture, for behavior recognition according to the present invention.

FIG. 5 depicts a non-limiting example of the behavior recognition sub-module 104, shown as an ARTSTORE architecture for behavior recognition in the present invention. First 500 and third 502 layers of the ARTSTORE architecture consist of Adaptive Resonance Theory (ART) networks. A second layer 504 of the ARTSTORE architecture consists of a Sustained Temporal Order Recurrent (STORE) temporal order network. Architectures for recognizing three-dimensional objects are described by Bradski and Grossberg in "Fast learning VIEWNET architectures for recognizing 3-D objects from multiple 2-D views" in Neural Networks, 8, 1053-1080, 1995, which is hereby incorporated by reference as though fully set forth herein. STORE provides a temporal working memory between the third layer 502 and the first layer 500 created by each ART network. The first layer 500 of the ARTSTORE architecture performs spatial pattern recognition, the second layer 504 of the ARTSTORE architecture encodes a sequence of state transitions as a behavior, and the third layer 502 performs spatio-temporal pattern recognition. The output of the third layer 502 is the recognized behavior 506, shown in FIG. 5 as an "exit gate".

ART networks are fast, on-line networks capable of clustering spatial or spatio-temporal patterns. The stored memories of ART networks remain stable in the face of new input, while remaining impressionable to these new inputs. ART networks may be operated in supervised or unsupervised modes. In a desired aspect, supervision comes from the BNs. STORE networks are also fast, on-line networks capable of encoding the temporal order of sequential events. Their storage performance is invariant to the particular order of events even with repetitions. The combined ARTSTORE architecture is capable of selectively attending to and learning stored sequences of past events or actions, which are used to ascertain if a current event is normal or abnormal. A predetermined threshold value is set for the dissimilarity of the current event to a stored event. As a non-limiting example, it is possible to add other features to compare against to decide anomaly/saliency (e.g. length of sequence, unique substrings of the sequence).

If the dissimilarity is greater than the threshold, the event is determined to be abnormal. The detection of an abnormal behavior can raise an alarm to a user who may then decide that the behavior is important enough to incorporate into the BNs. As shown in FIG. 5, with appropriate object graph 103 (e.g., FARG) input, the behavior recognition sub-module 104 (e.g., ARTSTORE) can track objects with respect to landmarks (e.g., trip-wire crossings) or other objects (e.g., people meeting near a car). For example, a recognized behavior 506 ("Exit Gate" behavior) could be modeled by four spatial scenes in a particular order (e.g., a1-a4). The first layer 500 of ARTSTORE would represent each spatial scene; the second layer 504 encodes a sequence of scenes; and the third layer 502 recognizes this particular order of scenes.

Figure 6:
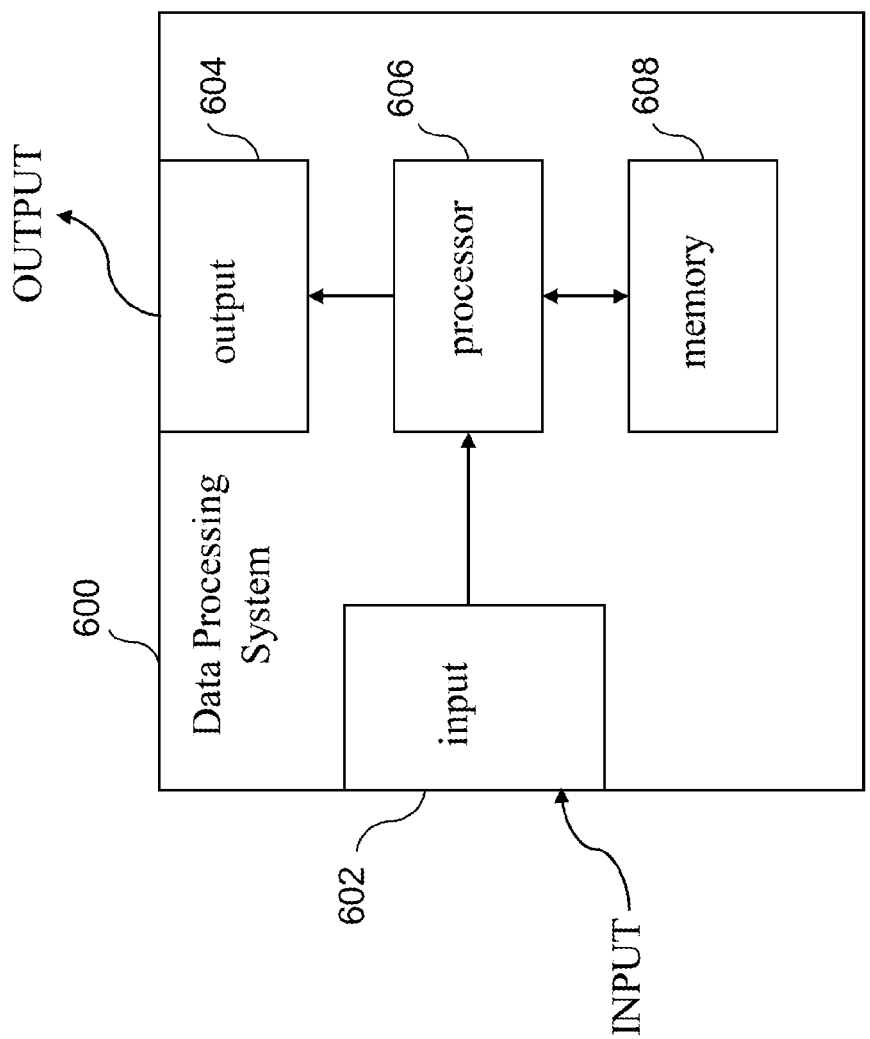
FIG. 6 is an illustration of a data processing system according to the present invention.

FIG. 6 illustrates a block diagram depicting components of a data processing system 600 (e.g., computer) incorporating the operations of the method described above. The method utilizes a data processing system 600 for storing computer executable instructions (or instruction means) for causing a processor to carry out the operations of the above described method. The data processing system 600 comprises an input 602 for receiving information from a user. Information received may include input from devices such as cameras, scanners, keypads, keyboards, microphone, other peripherals such as storage devices, other programs, etc. The input 602 may include multiple "ports." An output 604 is connected with a processor 606 (or processors) for providing information for transmission to other data processing systems, to storage devices, to display devices such as monitors, to generating information necessary for delivery, and to other mechanisms for presentation in user-usable forms. The input 602 and the output 604 are both coupled with the processor 606, which may be a general-purpose computer processor or a specialized processor designed specifically for use with the present invention. The processor 606 is coupled with a memory 608 to permit storage of data and software to be manipulated by commands to the processor 606.

Figure 7:
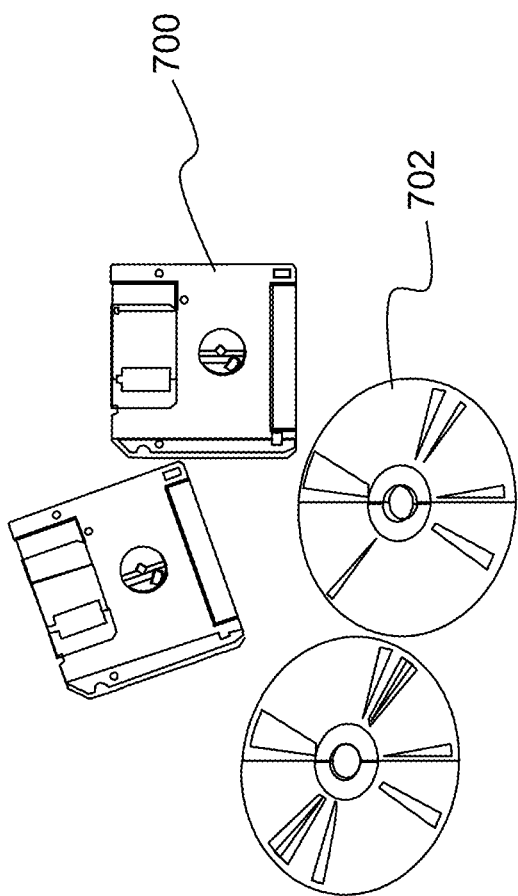
FIG. 7 is an illustration of a computer program product according to the present invention.

An illustrative diagram of a computer program product embodying the present invention is depicted in FIG. 7. As a non-limiting example, the computer program product is depicted as either a floppy disk 700 or an optical disk 702. However, as mentioned previously, the computer program product generally represents computer readable code (i.e., instruction means or instructions) stored on any compatible computer readable medium.

In summary, the visual behavior recognition system described herein provides for video forensics, data mining, and intelligent video archiving. Since FARGs can be queried in either graphical or linguistic form, they can be used to search video databases directly, or indirectly, through the representations BNs and ASNs create. An example video forensic application might involve finding all white cars that made a left turn at a particular intersection. Data mining can similarly be performed on the video databases or taught/learned representations. For instance, a user might desire to know during what time of the day cars make a left turn most. Lastly, video archiving can also be pursued by saving, for example, only the clips of white cars making left turns during atypical "left turn periods", immediately leading to anomaly detection.

What is claimed is:

1. A multi-modular system for object and behavior recognition, the system comprising one or more processors and a memory having instructions such that when the instructions are executed, the one or more processors perform operations of:
    operating a plurality of software agents configured to operate as a cooperative swarm to classify an object in a domain with an object recognition module;
    representing a spatial organization of the object in the domain using a graphical model with a graph-based object representation module;
    storing a set of known object behaviors to allow the system to recognize the set of known object behaviors with a knowledge sub-module of a reasoning and recognition engine module;
    learning both the set of known object behaviors from the knowledge sub-module and a set of novel object behaviors with a behavior recognition sub-module of the reasoning and recognition engine module, immediately from the graph-based object representation module;
    proposing the set of learned novel object behaviors from the behavior recognition sub-module back to the knowledge sub-module as a set of new behaviors derived from online learning; and
    outputting a behavior classification for the object, wherein the behavior classification for the object is classified as a known object behavior or as a novel object behavior based on comparison to a predetermined threshold value.

2. The multi-modular system for object and behavior recognition as set forth in claim 1, wherein the knowledge sub-module is a Bayesian network.

3. The multi-modular object and behavior recognition system as set forth in claim 2, wherein fuzzy attributed relational graphs provide an input for the reasoning and recognition engine module.

4. The multi-modular object and behavior recognition system as set forth in claim 3, wherein the Bayesian network is a Hidden Markov Model.

5. The multi-modular object and behavior recognition system as set forth in claim 1, wherein the knowledge sub-module is a Hidden Markov Model.

6. A computer-implemented method for object and behavior recognition, comprising an act of:
    causing a data processor to perform operations of:
        operating a plurality of software agents configured to operate as a cooperative swarm to classify an object in a domain with an object recognition module;
        representing a spatial organization of the object in the domain using a graphical model with a graph-based object representation module;
        storing a set of known object behaviors to allow the system to recognize the set of known object behaviors with a knowledge sub-module of a reasoning and recognition engine module;
        learning both the set of known object behaviors from the knowledge sub-module and a set of novel object behaviors with a behavior recognition sub-module of the reasoning and recognition engine module, immediately from the graph-based object representation module;
        proposing the set of learned novel object behaviors from the behavior recognition sub-module back to the knowledge sub-module as a set of new behaviors derived from online learning; and
        outputting a behavior classification for the object, wherein the behavior classification for the object is classified as a known object behavior or as a novel object behavior based on comparison to a predetermined threshold value.

7. The method for object and behavior recognition as set forth in claim 6, wherein the knowledge sub-module is a Bayesian network.

8. The method for object and behavior recognition as set forth in claim 7, wherein fuzzy attributed relational graphs provide an input for the reasoning and recognition engine module.

9. The method for object and behavior recognition as set forth in claim 8, wherein the Bayesian network is a Hidden Markov Model.

10. The method for object and behavior recognition as set forth in claim 6, wherein the knowledge sub-module is a Hidden Markov Model.

11. A computer program product for object and behavior recognition, the computer program product comprising:
    computer-readable instruction means stored on a non-transitory computer-readable medium that are executable by a computer having a processor for causing the processor to perform operations of:

operating a plurality of software agents configured to operate as a cooperative swarm to classify an object in a domain with an object recognition module;

representing a spatial organization of the object in the domain using a graphical model with a graph-based object representation module;

storing a set of known object behaviors to allow the system to recognize the set of known object behaviors with a knowledge sub-module of a reasoning and recognition engine module;

learning both the set of known object behaviors from the knowledge sub-module and a set of novel object behaviors with a behavior recognition sub-module of the reasoning and recognition engine module, immediately from the graph-based object representation module;

proposing the set of learned novel object behaviors from the behavior recognition sub-module back to the knowledge sub-module as a set of new behaviors derived from online learning; and outputting a behavior classification for the object, wherein the behavior classification for the object is classified as a known object behavior or as a novel object behavior based on comparison to a predetermined threshold value.

12. The computer program product for object and behavior recognition as set forth in claim 11, wherein the knowledge sub-module is a Bayesian network.

13. The computer program product for object and behavior recognition as set forth in claim 12, wherein fuzzy attributed relational graphs provide an input for the reasoning and recognition engine module.

14. The computer program product for object and behavior recognition as set forth in claim 13, wherein the Bayesian network is a Hidden Markov Model.

15. The computer program product for object and behavior recognition as set forth in claim 11, wherein the knowledge sub-module is a Hidden Markov Model.

\* \* \* \* \*